United States Patent [19]

Knappe

[11] Patent Number: 4,557,614

[45] Date of Patent: Dec. 10, 1985

[54] ANTI-FRICTION BEARING WITH A SEGMENTED CAGE, PARTICULARLY FOR LARGE CYLINDRICAL ROLLER BEARINGS

[75] Inventor: Bernhard Knappe, Obereuerheim, Fed. Rep. of Germany

[73] Assignee: FAG Kugelfischer Georg Schafer Kommanditgesellschaft Auf.Akt., Fed. Rep. of Germany

[21] Appl. No.: 539,279

[22] Filed: Oct. 5, 1983

[30] Foreign Application Priority Data

Nov. 11, 1982 [DE] Fed. Rep. of Germany ....... 3241659

[51] Int. Cl.$^4$ ............................................. F16C 33/46
[52] U.S. Cl. ................................................. 384/573
[58] Field of Search ............... 308/189 R, 201, 207 R, 308/216, 217, 218, 235; 384/523, 572, 573, 576

[56] References Cited

U.S. PATENT DOCUMENTS

| | | | |
|---|---|---|---|
| 3,938,866 | 2/1976 | Martin | 308/217 X |
| 3,975,066 | 8/1976 | Hofmann et al. | 308/217 X |
| 4,153,309 | 5/1979 | Markfelder et al. | 308/217 |
| 4,226,484 | 10/1980 | Glassow et al. | 308/201 |
| 4,398,775 | 8/1983 | Hofmann et al. | 308/201 |
| 4,451,098 | 5/1984 | Farley et al. | 308/201 |

FOREIGN PATENT DOCUMENTS

| | | | |
|---|---|---|---|
| 2449194 | 4/1976 | Fed. Rep. of Germany | 308/201 |
| 7914789 | 8/1979 | Fed. Rep. of Germany | . |
| 2308013 | 11/1976 | France | 308/201 |

Primary Examiner—Stuart S. Levy
Assistant Examiner—David Werner
Attorney, Agent, or Firm—Ostrolenk, Faber, Gerb & Soffen

[57] ABSTRACT

An anti-friction bearing, particularly for large cylindrical roller bearings where the bearing includes an outer ring, an inner ring, cylindrical roller bearing elements between the rings and an annular cage for holding the bearing elements between the rings. The cage comprises a plurality of cage segments, each holding a cylindrical roller bearing. Each segment has a pair of resilient radially inwardly extending noses at both sides thereof and these noses are received in grooves in the inner ring. The axially outer side parts of each segment extend radially to the outer ring and are curved there more sharply than the curvature of the outer ring. The outer side parts also extend to the inner ring and rest there on rounded projections.

5 Claims, 3 Drawing Figures

ANTI-FRICTION BEARING WITH A SEGMENTED CAGE, PARTICULARLY FOR LARGE CYLINDRICAL ROLLER BEARINGS

BACKGROUND OF THE INVENTION

The present invention relates to an anti-friction bearing with a segmented cage, which is particularly useful for cylindrical roller bearings.

An anti-friction bearing of this type includes an outer ring, an inner ring inside the outer ring and a plurality of roller members, in the form, for example, of cylindrical rollers, disposed between the outer and inner rings which serve as the races for the rollers. An annular cage supports the rollers between the rings. The cage here under consideration is comprised of a plurality of individual box-shaped segments. Each of the segments, for example, may hold a single one of the rollers. To support each segment to the rings, it is provided with a plurality of holding noses in the form of radial projections which are received in one of the races.

Such an anti-friction bearing is known, for instance, from German Utility Model (Gebrauchsmuster) No. 79 14 789. That bearing has the disadvantage that the holding noses on the cage segments, which are snapped into the grooves of the inner-race ring, can break off at higher speeds of rotation as a result of the centrifugal force on the cage. Furthermore, the sliding properties of the cage segments cannot be optimized, and there is the danger that the holding noses will jam under load. Furthermore, it is necessary to adapt the cage segments in each case to the curvature of the race of the bearing. This requires separate injection molds for the cage segments for each size bearing.

SUMMARY OF THE INVENTION

The objects of the invention are to develop an anti-friction bearing of the aforementioned kind such that the cage can be used for all sizes or diameters of bearings and is independent of the curvature of the bearing races, that centrifugal force does not harm the cage and races and that nevertheless a good holding of the rollers on the inner ring of the bearing is possible. Each cage segment is shaped so that it extends out to the outer race ring, whereby the centrifugal force on the cage segment will not break the holding noses. The holding noses on the cage segment comprise a plurality of resilient holding noses formed on the cage segment and extending to the inner ring. The inner ring is provided with groove means therein for receiving the holding noses.

The exterior of the cage segment, and particularly its axially outer side parts, extend to the outer ring. At the outer ring, the side parts are curved and are more sharply curved and rounded than the curvature of the outer ring. This enables the segments to be received in various diameter inner and outer rings.

There are preferably two of the holding noses at at least one of the axially inner sides of the cage segment for being resiliently received in a respective groove in the inner ring. In the preferred embodiment, there are two of the noses at each of the sides of the segment and each of those noses is received in a respective groove. The inner ring has a depressed groove which defines a race in which the roller members ride and the grooves for receiving the holding noses are formed in the side walls of the roller groove in the inner ring.

The axially outer side parts of the cage segments, which engage the outer ring, also may extend to and engage the inner ring, and may include two rounded projections which slide along the inner ring.

Due to the fact that the axially outer side parts of the cage segments extend up to the inner ring and have rounded projections where they meet the inner ring, the segments are suitably supported on the inner ring, from the standpoint of lubricating technique. Due to the dimensions of the cage segment outer side parts, the holding noses on the cage segments are relieved from load in operation, whereby the guidance of the cage segments is assured exclusively between rim and race. the rounding of the segment side parts toward the outer ring also forms a dependable supporting of the segments from a lubricating standpoint and thus provides good sliding properties even at high speeds of rotation. Due to the greater rounding of the segment side parts, this cage can be used for many sizes of bearings, regardless of their curvatures. Upon both assembly and disassembly of the bearing, the holding noses on the cage segments alone hold the segments and the supported rollers fast to the race of the inner ring.

The invention is now described in detail with reference to an illustrative embodiment.

DESCRIPTION OF A PREFERRED EMBODIMENT

Figure 1:
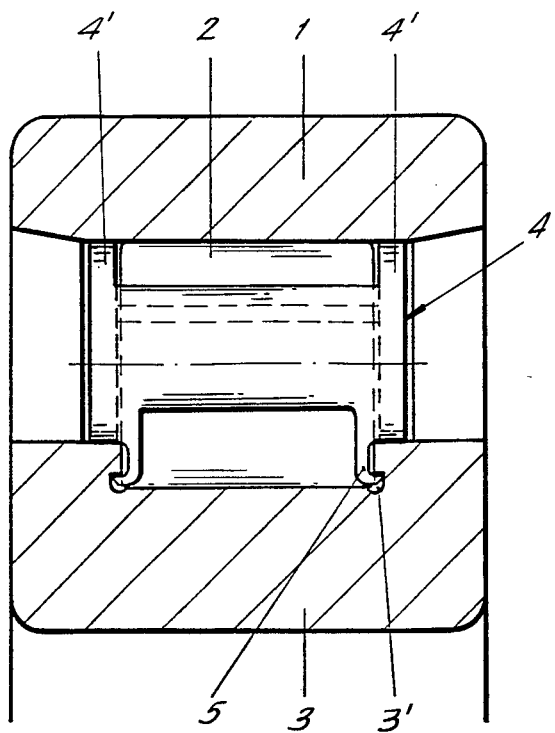
FIG. 1 shows a partial axial cross-section of a cylindrical roller bearing having a cage segment in accordance with the invention.

In FIG. 1, the roller bearing includes the outer ring 1, the intermediate roller members 2 and the inner ring 3. Each roller member 2 comprises a cylindrical roller which rides between the races defined by the outer and inner rings.

An annular cage guides the roller members between the rings. The cage is segmented. Each roller member 2 is surrounded by a box-like cage segment 4, which is provided with radially inwardly and then axially outwardly projecting holding noses 5 at all four axially outward circumferentially opposite corners. The noses are resilient to deform to snap into grooves in the inner ring and are each snapped into the annular grooves 3' in the inner ring, which prevent the roller members and their cage segments from dropping out while the outer ring 1 has not yet been mounted. The inner ring has a radially inward depression in its central region, and this defines the inner race for the roller members 2. The grooves 3' are defined in the opposite side walls of that depression. The cage has segment side parts 4' at its opposite axial sides, which extend radially up to the outer ring 1. When the bearing is installed, the axially outward segment side parts 4' of the cage segments 4 rest against the outer ring. In that way, the holding noses 5 are relieved from the centrifugal forces which occur in operation. The guiding of the cage segments 4 is effected exclusively between the outer-ring race and the rim of the inner ring.

It is also advantageous for the segment side parts 4' to extend radially inward to the inner ring 3 and be provided there with a slide surface. The slide surface may be a curved surface (not shown) or may comprise two convexly rounded projections 6 (FIG. 2).

Figure 2:
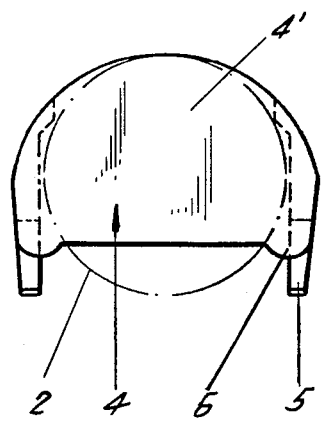
FIG. 2 shows a cage segment in side view.
Figure 3:
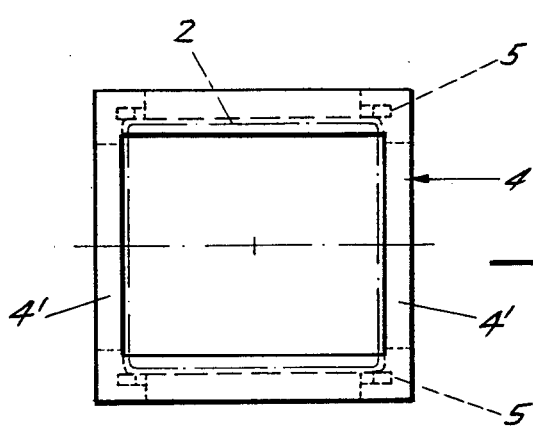
FIG. 3 shows a cage segment in top view.

As can be noted from FIG. 2, the segment side parts 4' are also rounded on their radial side facing the outer ring 1. This curvature is greater than, i.e. it has a smaller radius of curvature, than the curvature of the outer ring 1. This has the advantage that a film of lubricant can build up between outer ring 1 and cage segment 4.

The same cage segments 4 can be used for different bearing diameters, because of the small number, i.e. one, of the bearing rollers supported by each cage segment and because of the number and placements of points of contact between the cage segments and the rings.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A cage for an annular anti-friction bearing, wherein the bearing comprises an outer ring, an inner ring inside the outer ring, and roller members for rolling in races defined by the outer and the inner rings;

the cage comprising a plurality of cage segments which together extend annularly around the bearing and together hold the roller members between the outer and the inner rings;

each segment being shaped for holding a roller member therein; each segment having a plurality of resilient holding noses formed thereon which extend toward the inner ring for being received at the inner ring; and each segment also being shaped to extend into engagement with the outer ring;

the said segment having axially outer side parts which are the parts thereof that extend to the outer ring, and at the outer ring, the said segment side parts being more sharply curved rounded than the curvature of the outer ring.

2. An anti-friction bearing comprising:

an outer ring; an inner ring inside the outer ring; the rings defining respective races for roller members disposed between the rings; and a plurality of roller members disposed in the races of the inner and outer rings; and a cage extending annularly around the bearing and holding the roller members between the outer and the inner rings; the cage comprising a plurality of segments which together extend annularly around the bearing; each segment being shaped for holding and holding at least one of the roller members; each segment having a plurality of resilient holding noses formed thereon and extending to the inner ring for being received at the inner ring, and each segment also being shaped to extend into engagement with the outer ring while the holding noses are received at the inner ring;

the inner ring having a groove means therein placed for receiving the noses of the cage segments therein, and the noses being resiliently snappable into and out of the groove means;

the said segment having axially outer side parts which are the parts thereof that extend to the outer ring, and at the outer ring, the segment side parts being more sharply curved rounded than the curvature of the outer ring.

3. The bearing of claim 2, wherein there is one of the roller members supported at each cage segment.

4. The bearing of claim 2, wherein the segment side parts extend to the inner ring and include there a slide surface for sliding on the inner ring.

5. The bearing of claim 4, wherein the slide surface comprises two spaced apart, rounded projections.

* * * * *